J. F. Jones. Sheet 1. 2 Sheets.
Pasteboard Mach.
No. 1,898. Reissued Mar. 7, 1865.
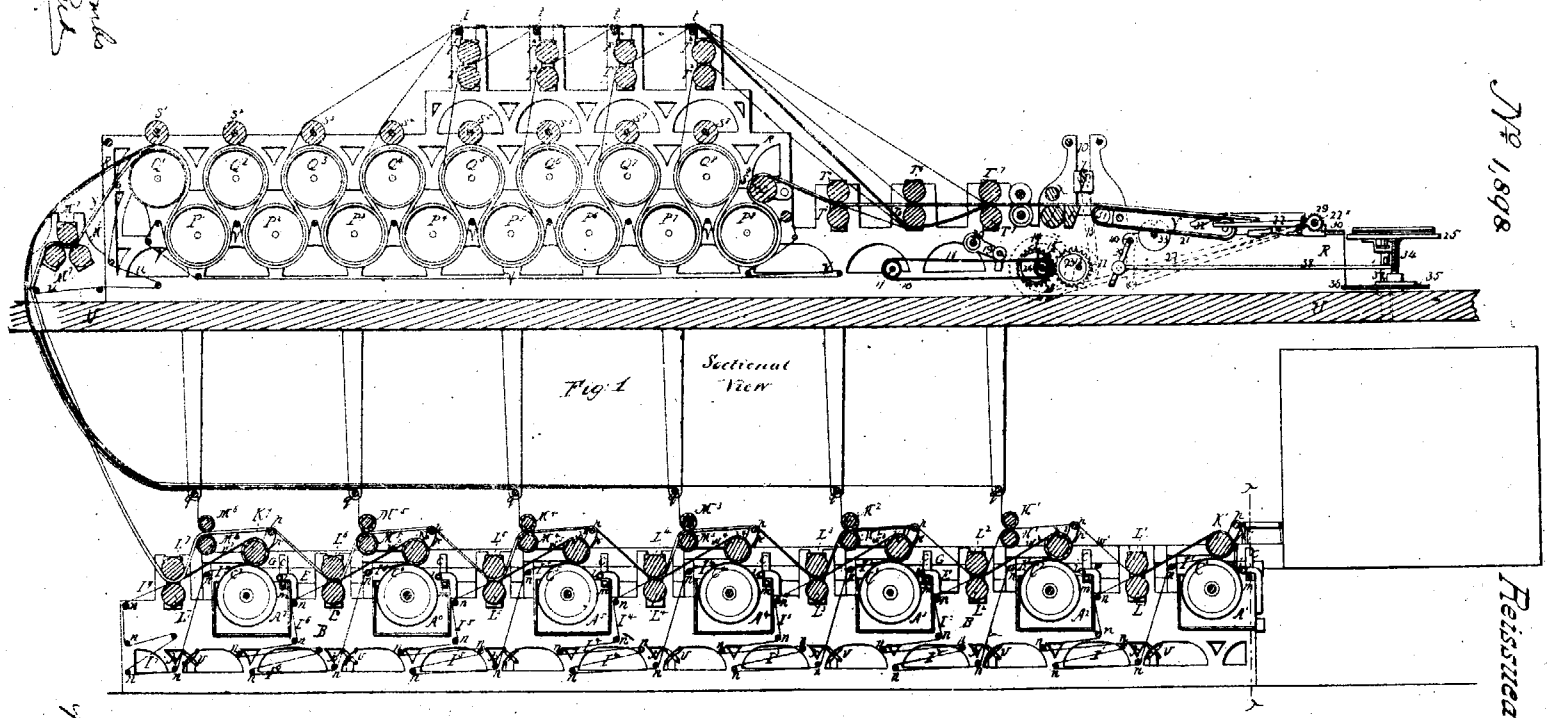
Witnesses
J. W. Coombs
G. W. Reed
Inventor
J. F. Jones
per Munn & Co.
Attorneys J. F. Jones. Sheet 2. 2 Sheets
Pasteboard Mach.
No. 1,898 Reissued Mar. 7, 1865.
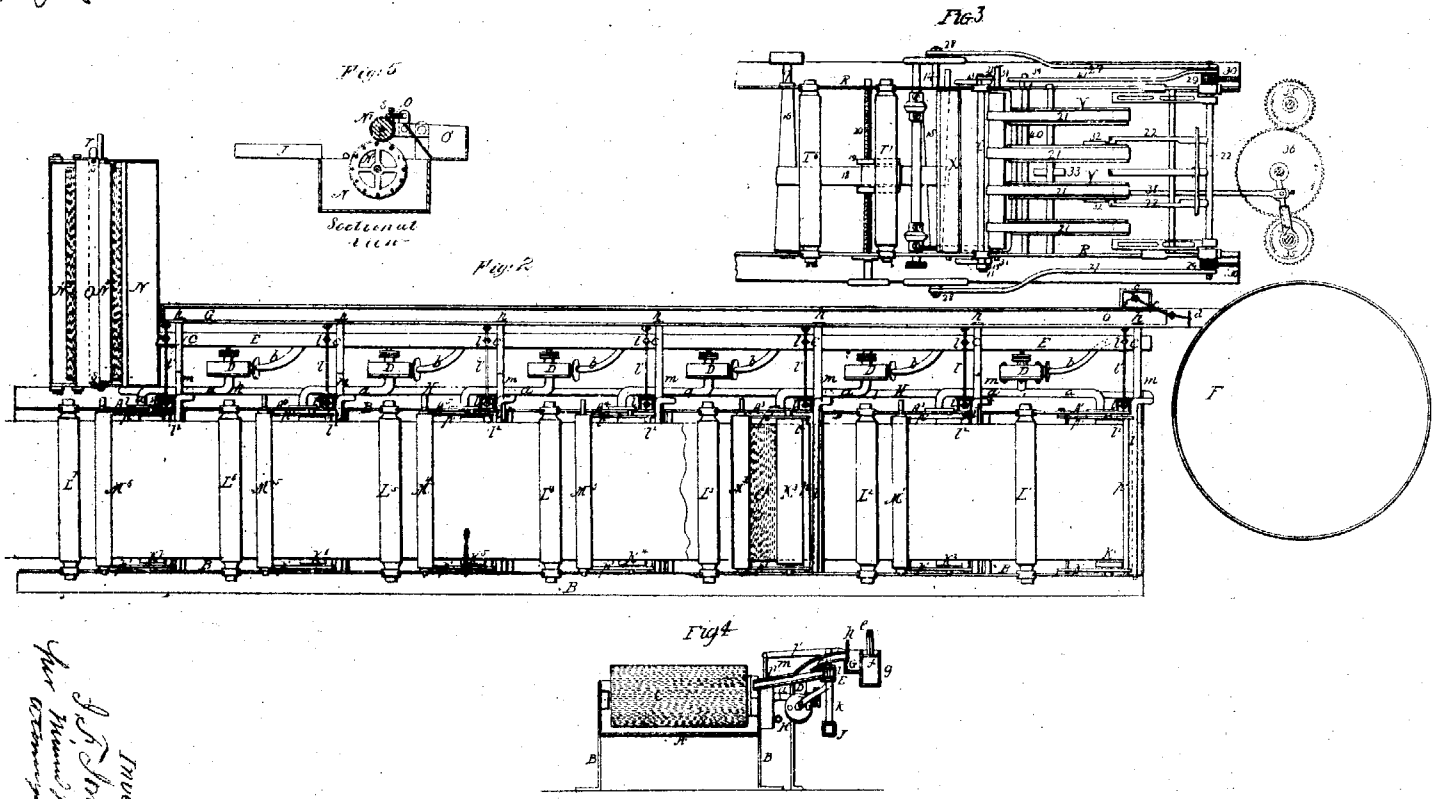
Witnesses:
J. W. Coombs
G. W. Reed
Inventor
J. F. Jones
per Munn & Co
Attorneys

UNITED STATES PATENT OFFICE.

JOHN F. JONES, OF ROCHESTER, NEW YORK.

IMPROVEMENT IN MACHINES FOR MAKING PAPER AND PAPER BOARDS.

Specification forming part of Letters Patent No. 40,265, dated October 13, 1863; Reissue No. 1,898, dated March 7, 1865.

*To all whom it may concern:*

Be it known that I, JOHN F. JONES, of the city of Rochester, in the county of Monroe and State of New York, did invent certain new and useful Improvements in Machinery for the Manufacture of Paper and of various kinds of Boards Produced from Fibrous Substances, for which Letters Patent were granted on the 13th day of October, 1863; and I do hereby declare that the following is a full, clear, and exact description of the same, reference being had to the accompanying drawings, forming part of this specification.

Figure 1 is a vertical sectional view of two floors of a paper-mill, showing a longitudinal vertical section of my machinery. Fig. 2 is a plan of the machinery on the lower floor. Fig. 3 is a plan of a portion of the machinery on the upper floor. Fig. 4 is a transverse vertical section in the plane indicated by the line *x x* in Fig. 1. Fig. 5 is a vertical section of my improved "save-all."

Like letters of reference indicate corresponding parts in all the figures.

My improved machine is more expressly intended for the making of paper-board of any desired thickness, though at the same time it is also adapted to the making of ordinary paper.

To this end my invention consists in forming paper-board in a continuous length by depositing one web or layer of paper upon another successively to any desired extent in the act of formation or in passing through the machinery; also, in the producing such board in the employment of a series of two or more distinct paper-machines combined in one, each separate machine of which produces a web by itself, that constitutes one layer of the aggregate forming the board; and in the arrangement of drying and calendering apparatus for drying and calendering such board while in a continuous length and before it is cut into sheets, so that the board is made and finished ready for the market at one continuous operation.

It also consists in a certain novel system of troughs or spouts, connecting-pipes, and valves, whereby a properly regulated supply of pulp and water to each of the several machines and the carrying away of the back water therefrom are provided for.

It also consists in the employment, in combination with two or more paper-making machines, or with a single machine, of an improved save-all, composed of a vat for the collection of the back water from the machine or machines, a reticulated cylinder, like that of a cylinder paper-making machine, working in the said vat, for the freeing of the pulp from the water, and, if desired, a coucher for receiving the pulp from the said cylinder, and a scraper for removing the pulp from the coucher and depositing it in a suitable receptacle; and it further consists in certain arrangements of the press-rolls, and of the drying-cylinders and calendering-rolls for drying and calendering either boards or paper.

To enable others skilled in the art to make and use my invention, I will proceed to describe its construction and operation.

In the formation of board by the deposit together of several webs of paper, I employ a combined machine made up of several single machines, each of which forms a web. These single machines may be constructed in any manner to produce the desired result; but I prefer the cylinder-machines, hereinafter described.

As represented in the drawings, $A'$ $A^2$ $A^3$ $A^4$ $A^5$ $A^6$ $A^7$ are the vats, arranged side by side at short distances apart, and supported at some distance above the lower floor of the mill in a suitable framing, B B, erected on said floor.

$C'$ $C^2$ $C^3$ $C^4$ $C^5$ $C^6$ $C^7$ are the rotating reticulated cylinders, or cylinder-molds, which may be of the usual or any suitable construction, and packed at their ends in the usual or any suitable manner.

D D, Fig. 2, are the pumps, one for each vat, for drawing water from the cylinders, having their suction-pipes *a a* connected with the vats, and their delivery-pipes *b b*, connected with an elevated horizontal or slightly-inclined covered spout, E, which extends along the back of the whole series of vats. This spout E is divided by transverse partitions into a number of compartments corresponding with the number of vats, and its several compartments are connected with the several vats, one with each, by means of pipes *m*, for the return to the vats of as much as desirable of the back water which has been drawn out by the pumps and forced up into the said spout.

F is the stuff-chest containing the pulp for the supply of the vats, and G is an open spout running from the stuff-chest along the back of the whole series of vats, with pipes *c* leading to the several vats. This spout G is fitted near the stuff-chest F with a gate, *d*, connected by a lever, *e*, with a float, *f*, which is arranged in a box, *g*, at the back of and in communication with the said spout to regulate the depth of pulp in the spout, the said float rising with any increase in such depth, and so lowering and reducing the opening of the gate, and thereby regulating the supply of pulp from the stuff-chest. The pipes *c* are severally fitted at their junction with the spout G, with gates or valves *h h*, adjustable by hand to regulate the quantity of pulp passing from the said spout to the vats, and the said pipes connect with the pipes *m* of their respective vats, so that the pulp and the returned back water enter the vats together, and the back water keeps the mouth of the pulp-pipe clear.

H, Figs. 2 and 4, is a pipe running all along the back of the whole series of vats, and receiving water under a suitable pressure from an elevated reservoir, or by other means, for the supply of the two series of shower-pipes *i j*, and the first-mentioned series of shower-pipes *i*, are arranged to throw showers upon the several cylinders in the same manner as the shower-pipes of other cylinder paper-making machines, and the other series, *j*, are arranged opposite the rotary felt-beaters *v v*, to wash the felts $I'$ $I^2$ $I^3$ $I^4$ $I^5$ $I^6$ $I^7$ of the several machines.

Directly under the spout E, before mentioned, there is another covered spout, J, which also extends along the back of the whole series of vats, and this spout is connected with the several compartments of the spout E by a series of upright pipes, *k*, Fig. 4, one opposite to each vat, and each of these pipes *k* is fitted at its junction with the bottom of the spout E with a valve, *l*, which is attached to a lever $l'$, and the said lever is connected by a rod, $l^2$, with a float working in a box, $l^3$, attached to the back of and communicating with its respective vat, the object of the said floats and valves being to regulate the height of the water in the several vats.

While the water remains below a certain level in any one of the vats, the weight of its respective floats keeps its respective valve closed, and prevents the water in the spout E from running down the pipe *k* opposite to the said vat, and so keeps up the supply of returning back water through its respective pipe *m*; but when the water rises up to or above that level, the float is raised, and the valve thereby opened to permit the water to escape from the spout E into the lower spout, J, whence it escapes to the save-all hereinafter described.

$K'$ $K^2$ $K^3$ $K^4$ $K^5$ $K^6$ $K^7$ are the couchers applied in relation to the cylinders as in other cylinder paper-making machines, and having the endless felts $I'$ $I^2$ $I^3$ $I^4$ $I^5$ $I^6$ $I^7$ running round them in the usual manner. In order to obtain the requisite length for the felt, and yet bring the vats $A'$ $A^2$, &c., very near together, the felts are severally arranged to pass down between their respective vats and the next vats in advance of them, and to run back and forth, one, two, or more times under the latter, as shown in Fig. 1, and it is to permit this arrangement of the felts, that the vats are raised some distance from the floor instead of being placed directly upon the floor, as has heretofore been the common practice.

*n n n n* are the carrying-rolls, carrying the felts. *v* are the felt-beaters arranged below the vats opposite the shower-pipes *j j*.

$L'$ $L^2$ $L^3$ $L^4$ $L^5$ $L^6$ $L^7$ are the wet-press rolls, and $M'$ $M^2$ $M^3$ $M^4$ $M^5$ $M^6$ $M^7$ the second-press rolls suitably arranged with respect to the felts. The latter rolls are preferably covered with felt. P are carrying-rolls arranged in the same frames, $P'$, in which the couchers are arranged. *q* are carrying-rolls arranged in hangers suspended from the floor above the vats.

My machinery as far as I have described it will be recognized by the practical paper-maker as composed of a series of distinct cylinder paper-making machines, each of which is capable of producing a separate and distinct web of paper.

N, Figs. 2 and 5, is the save-all vat, arranged behind the vat $A^7$, which is the farthest of the series $A'$, $A^2$, &c., from the stuff-chest.

$N'$ is a reticulated rotating cylinder running in the said vat, and this may be fitted and packed to one end of the vat in the same manner as the cylinders of cylinder paper-making machines, and have a suction-pipe, *r*, opening from it to draw off water and produce a partial vacuum. The back water containing a greater or less quantity of pulp, escaping by the spout J, is delivered into the vat N, where, by the rotation of the cylinder, the pulp gathers on its surface, while the water is drawn off by means of the pipe *r*. The pulp thus gathers in the vat in a mass, while the cylinder, by its revolutions, keeps its perforations open to allow the escape of the water. Above the cylinder may be used a coucher, $N^2$, running directly in contact therewith, and over this coucher may rest a scraper, O, set in any desired position, by means of adjusting-screws *s s*, and in rear of this is a receptacle, $O'$. As the coucher revolves, it takes the pulp from the surface of the cylinder, while in turn the scraper removes it from the coucher and deposits it in the receptacle. This save-all may be used in connection with a single cylinder paper-machine, or with a Fourdrinier machine. If desired, the pulp can be saved by pumping it up or drawing it off from the vat when the water is drawn off through the pipe *r*, when it is desirable not to use the coucher.

$P'$ $P^2$ $P^3$ $P^4$ $P^5$ $P^6$ $P^7$ $P^8$ and $Q'$ $Q^2$ $Q^3$ $Q^4$ $Q^5$ $Q^6$ $Q^7$ $Q^8$ are two tiers of steam drying-cylinders, arranged in suitable bearings in a framing, R, erected on the upper floor over the series of machines hereinbefore described, the upper tier of cylinders being arranged over the spaces between the lower ones.

*u* is an endless apron running under the lower series of drying-cylinders on a system of carrying-rolls, V V, so arranged as to keep it pressing against a large portion of the circumference of each of said cylinders, for the purpose of holding the board or paper in contact therewith, as it passes under the said cylinders.

$S'$ $S^2$ $S^3$ $S^4$ $S^5$ $S^6$ $S^7$ $S^8$ are calender-rolls arranged above the upper drying cylinders, to operate in combination with the said cylinders, and $S^9$ is a calender-roll arranged above the last drying-cylinder, $P^9$, to operate in combination therewith.

$T'$ $T^2$ $T^3$ $T^4$ $T^5$ $T^6$ $T^7$ are calender-rolls arranged in pairs, the number of pairs corresponding with the number of single machines on the lower floor, four pairs being arranged above the drying cylinders, and the other three pairs beyond the end of the series of drying-cylinders, between it and the apparatus by which the board or paper is cut into sheets, and which will not be described until after the operation of making the board or paper has been described.

*t t t t* are carrying-rolls arranged above the calender-rolls $T^2$ $T^3$ $T^4$ $T^5$ and only used in making paper, not when making paper-board.

At the left hand upper corner of Fig. 1 there is represented an improved system of second press-rolls, $M^7$ $M^7$ $M^7$. These press-rolls belong properly to the last machine of the series on the lower floor, but are arranged on the upper floor, and have a separate felt, *u*. The improvement consists in the use of three instead of two, one arranged above the other two, which are arranged at such distances apart that the upper one may press upon both of them, and the web passing between the upper one and both the lower ones, and receiving two pressures with the use of but three rolls.

The several separate paper-making machines and the several pressing-rolls, drying-cylinders and calender-rolls are driven by a suitable system or systems of gearing, having motion communicated by water, steam, or other power.

The manufacture of board, which is the principal purpose for which my machinery is designed is performed in the following manner: Each of the machines upon the lower floor produces a separate layer, as though it were separately used for the manufacture of paper. The web $w'$ from the first machine, after leaving its felt $I'$, and passing between the second press-rolls $M'$, has deposited upon its lower side the layer $w^2$ from the second machine, while the latter is upon its felt $I^2$, and before it passes between the wet-press rolls $L^2$, and both of these webs pass together, and are pressed between the latter rolls, and between the second-press rolls $M^2$, and have deposited upon their under side the third layer, $w^3$, after which the three together pass between the press-rolls, $L^3$ and $L^3$, and onto the next machine to have deposited on their under side the fourth layer, $w^4$, and so on throughout the whole series of machines, to the last wet-press rolls, $L^7$, by which all the webs are pressed together, and from which they pass upward through the floor to the second-press-rolls $M^7$. The successive pressing operations to which the webs or layers are subjected after each additional layer is applied causes them to be united by the natural adhesiveness of the pulp, and the several webs or layers are thus combined to form one thick web or board, which only requires to be dried and calendered to be fit for the market, being either cut up into sheets or not, according as may be desired. By this means, it will be perceived that the board is thickened and formed gradually from beginning to end, in its passage through the combined machine, and at the conclusion forms a material that is much harder and more compact than can be formed in any other manner, since each web or layer is first pressed by itself, before the succeeding deposit is made upon it. This, of course, makes it much more solid than if the whole thickness of the board were pressed at once; and while this effect of a series of pressures is produced, at the same time the separate layers do not get so dry that they will not adhere, but the process is, as it were, a continuous one, the deposit being made gradually.

I am aware of no machine or process prior to mine in which successive layers, to an indefinite extent, are made on the web to thicken it while it is in the act of formation or passing through the machine.

The drying of the combined web or board $y'$ is performed by its passing alternately over the upper steam-heated cylinders, $Q'$ $Q^2$, &c., and under the lower ones $P'$ $P^2$, &c., as illustrated in the upper part of Fig. 1, being calendered on one side in the drying operation by the rolls $S'$ to $S^8$, and on the opposite side by the roll $S^9$, and afterward subjected to a final calendering operation on both sides by passing between the several pairs of rolls $T'$, $T^6$, and $T^7$, whence it may pass to a roll or to the cutting machinery, hereinafter described, to be cut into sheets.

In manufacturing paper in separate sheets the webs $w'$ $w^2$ $w^3$ $w^4$ $w^5$ $w^6$ $w^7$ from the several machines constituting the combined machine on the lower floor, instead of being laid and pressed together as they leave the machine, as described with reference to the manufacture of boards, are only pressed separately between their respective wet-press rolls and second-press rolls; and from the second-press rolls they pass singly, (as shown in blue color in Fig 1,) to the carrying-rolls *q q*, and thence to the drying-cylinders. The several webs pass together round the drying cylinders $Q'$ $P'$ $Q^2$ $P^2$ and over $Q^3$, and at the latter cylinder the then upper web of paper is separated to pass singly over the carrying-rolls *t t* to the calender-rolls $T^7$, where it is calendered. The other webs all pass together to the cylinder $Q^4$, where the next adjacent web is separated to pass over the carrying-rollers *t t* to the calender-rolls $T^6$, and the rest severally pass onward between the cylinders till at suitable points in the train of cylinders the other webs successively are separated to pass respectively between the calender rolls $T^5$, $T^4$, $T^3$, and $T^2$, the lower web only passing through the whole train of cylinders, and passing singly to and between the rolls $T'$. The webs $w^5$ $w^4$ $w^3$ $w^2$ pass from their respective calender-rolls over the rolls *t t*, and thence down under the rolls $T^6$ and $T^7$, and the whole of the webs are brought together at the pair of delivery-rolls X, which carries them all together to the cutting apparatus to be cut into sheets, or delivers them to rolls, upon which they may be separately rolled up as desired.

The cutting apparatus, which may be used for either boards or paper, is composed of a stationary horizontal blade, *x*, and a vertically-moving horizontal blade, *z*, which works in stationary guides 10 10 in the framing R. The board or paper is delivered by the rolls over the stationary blade *x*, and under the moving one *z*, and cut by the descent of the latter at regular intervals into sheets of uniform length, which may be varied by making the cutter descend more or less frequently. The blade *z* is driven by two cranks, 11, at the opposite ends of a shaft, 12, and two rods, 13, connecting it with the said cranks. The shaft 12 derives rotary motion through a pair of eccentric gears, 23 24, through gearing from a shaft, 14, which carries one of a pair of cone-pulleys, 15 16, the other of said pulleys being upon a shaft, 17, which derives motion through a belt or gearing at a uniform speed relatively to the calendering-rolls and the delivery-rolls X. The eccentric gears produce an accelerated motion of the upper blade, *z*, as it comes in contact with the board or paper, and thereby enables it to cut easily through any desirable thickness of board or paper. The belt 18, running around the cone-pulleys, has applied to it a shifter, 19, operated by a screw, 20, by which the frequency with which the cutter descends relatively to the velocity at which the paper or board is delivered, may be adjusted to regulate or varied to vary the length of the sheets. In front of the cutters there is a horizontal frame, Y, in which run a series of endless moving tapes or bands, 21, which, receiving the sheets one at a time, as they are cut off, carry them forward onto a swinging flier or lay-boy, 22, which by making half a revolution turns them over and deposits them upon a piling-table, 25, which descends a distance equal to the thickness of one sheet every time a sheet has been placed upon it. The flier or lay-boy derives a horizontal reciprocating motion from two cranks, 28, on opposite ends of the shaft 14, which are connected with its own shaft 22* by two connecting-rods, 27, and its turning over is effected by means of two pinions, 29, on the shaft 22*, working in racks 30 on the framing R.

To enable the points of the flier-arms to pass under the sheet as the flier moves back, and to prevent them from catching the front edge of the sheet, the frame Y is made capable of a slight tipping motion by having the end next the cutters arranged upon a horizontal shaft, 31. As the flier moves toward the cutters to take the sheet, the turned up points of its arms pass under inclined projections 32 on the frame Y, and so lift it up high enough to insure the arms passing under the sheet. After the points of the arms have passed the projections 32, the frame Y drops onto the fixed rest 33, arranged below it, and in returning with the sheet the arms of the flier pass over the said projections.

The descent of the piling-table 25 is effected by means of two upright screws, 34, of similar pitch, attached firmly to its under side, and passing through nuts secured firmly in the hubs of two spur-gears, 35, of similar size, which are geared together by an intermediate gear, 36. The gears 35 are prevented from moving vertically, and hence by turning them they are caused to produce a vertical movement of the screws and of the table. One of the gears, 35, has applied to it a vibrating friction-dog, 37, which is connected by a rod, 38, with the arm 39 of a horizontal rock-shaft, 40, which derives motion by being connected by a rod, 41, with the flier. The dog 37 is so fitted to a projecting flange on the gear that it will turn the gear in the direction to depress its screw, but not in the other direction. The two gears 35, being geared together, are caused to be turned uniformly, and hence the table is kept perfectly level.

I do not claim making paper-board by one or more cylinder-molds, with felts and press-rolls running until a sheet is formed of sufficient thickness to take off the roll by breaking or separating it, at a groove in the press-roll in its wet state, a single sheet at a time, as this is not the equivalent of my invention. In such case a continuous length is not formed. Neither do I claim reeling the separate webs on reels, and doubling the webs or sheets from the reels, and thence passing it over the drying-machine after having acquired a proper thickness; but

What I claim as my invention, and desire to secure by Letters Patent, is—

1. Forming paper or paper-board of any thinkness in a continuous sheet by adding to the web a succession of any number of layers of pulp, each succeeding layer being added and pressed to the preceding one in the aggregate or compound web before leaving its felt, and the compound web being subjected to pressure after each addition of a layer of pulp, substantially as and for the purposes herein specified.

2. Forming paper-board of a continuous or indefinite length by means of any required number of separate paper-making machines arranged as a whole, or as a combined machine, in such a manner that each separate machine successively deposits a layer or web of its own to form the aggregate layers of the board in the act of formation or passing through the combined machine, substantially as herein set forth.

3. The combination of a system of cylinder-molds, as hereinabove specified, and a continuous series of drying-cylinders and calendering-rolls, in such a manner that the manufacture either of boards of any thickness, or of several webs of paper, may be carried on by a single continuous process, substantially as herein described.

4. The arrangement of the several spouts, G E J, pipes *c*, *m*, and *j*, valve $l^2$, and self-acting feed gate *d*, in combination with each other, and with the several vats, substantially as and for the purpose herein specified.

5. The save all composed of a vat, a cylinder-mold, a coucher, and a scraper, combined and applied in connection with one or more paper-making machines, substantially as herein specified.

6. The combination of press-rolls, illustrated by $M^7$ $M^7$ $M^7$ in Fig. 1, to obtain two pressures from three rolls, as herein described.

7. The employment of calender-rolls on the top of drying-cylinders, substantially as herein described, to equalize the water in the board and make it of uniform dryness as it passes over the driers, and partially effect the glazing and calendering process while the board is being dried.

8. The cutting apparatus *x z*, operated by the means and in the manner herein set forth.

9. The lay-boy 22, constructed and operating in the manner and by the means herein described.

JOHN F. JONES.

Witnesses:
R. F. OSGOOD,
JNO. L. JUDSON.